(12) United States Patent
Cullmann et al.

(10) Patent No.: US 12,539,758 B2
(45) Date of Patent: Feb. 3, 2026

(54) METHOD AND SYSTEM FOR CHECKING AVAILABILITY OF AN ONLINE FUNCTION OF A VOICE RECOGNITION SYSTEM IN A MOTOR VEHICLE

(71) Applicant: Volkswagen Aktiengesellschaft, Wolfsburg (DE)

(72) Inventors: Jaqueline Cullmann, Braunschweig (DE); Julia Schettler, Gifhorn (DE); Marcel Varnhorn, Wahrenholz (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 191 days.

(21) Appl. No.: 18/564,474

(22) PCT Filed: Apr. 26, 2022

(86) PCT No.: PCT/EP2022/061085
§ 371 (c)(1),
(2) Date: Nov. 27, 2023

(87) PCT Pub. No.: WO2022/253492
PCT Pub. Date: Dec. 8, 2022

(65) Prior Publication Data
US 2024/0262197 A1  Aug. 8, 2024

(30) Foreign Application Priority Data

May 31, 2021 (DE) ..................... 10 2021 205 528.1

(51) Int. Cl.
*B60K 35/26* (2024.01)
*B60K 35/10* (2024.01)
(Continued)

(52) U.S. Cl.
CPC .............. *B60K 35/26* (2024.01); *B60K 35/10* (2024.01); *B60K 35/22* (2024.01); *B60K 35/23* (2024.01);
(Continued)

(58) Field of Classification Search
CPC ........ B60K 35/10; B60K 35/22; B60K 35/23; B60K 35/26; B60K 35/265; B60K 35/28;
(Continued)

(56) References Cited

U.S. PATENT DOCUMENTS 6,336,091 B1 * 1/2002 Polikaitis ................ G10L 25/78
704/275
6,785,647 B2 * 8/2004 Hutchison ............... G10L 15/16
704/E15.047
(Continued)

FOREIGN PATENT DOCUMENTS

CN  112992145 A  6/2021
DE  102011121110 A1  6/2013
(Continued)

OTHER PUBLICATIONS

PCT/EP2022/061085, International Search Report (Aug. 19, 2022).
(Continued)

*Primary Examiner* — Richard M Camby
(74) *Attorney, Agent, or Firm* — Peter Zura; LOZA & LOZA, LLP (57) ABSTRACT

Method and system for checking availability of an online function of a voice recognition system in a motor vehicle. A communication connection is provided between a communication interface in the motor vehicle and an external device, where it is determined whether the provided communication connection exists or has been interrupted at a current time. If the communication connection exists, a check is carried out in order to determine whether the online (Continued)

function of the voice recognition system of the motor vehicle is available via the existing communication connection. If the online function is not available and/or the communication connection has been interrupted, a notification describing a lack of availability of the online function of the voice recognition system is provided in the motor vehicle. The notification is provided irrespective of actual activation and/or use of the voice recognition system.

20 Claims, 2 Drawing Sheets

(51) Int. Cl.
*B60K 35/22* (2024.01)
*B60K 35/23* (2024.01)
*B60K 35/28* (2024.01)
*B60K 35/60* (2024.01)
*G10L 15/30* (2013.01)

(52) U.S. Cl.
CPC ............ *B60K 35/265* (2024.01); *B60K 35/28* (2024.01); *B60K 35/60* (2024.01); *G10L 15/30* (2013.01); *B60K 2360/148* (2024.01); *B60K 2360/592* (2024.01)

(58) Field of Classification Search
CPC .............. B60K 35/60; B60K 2360/148; B60K 2360/592; B60K 2360/566; B60K 35/20; B60K 35/80; B60K 35/85; G10L 15/30
See application file for complete search history.

(56) References Cited

U.S. PATENT DOCUMENTS

| | | | | |
|---|---|---|---|---|
| 10,818,286 | B2 * | 10/2020 | Huang | G10L 15/22 |
| 11,127,405 | B1 * | 9/2021 | Antos | G10L 15/30 |
| 2019/0051295 | A1 * | 2/2019 | Voigt | G10L 15/22 |
| 2022/0383857 | A1 * | 12/2022 | Le Groux | G06N 3/044 |

FOREIGN PATENT DOCUMENTS

| | | | | |
|---|---|---|---|---|
| DE | 102014019192 | A1 | 6/2016 | |
| DE | 102016206332 | A1 | 10/2017 | |
| DE | 102017220266 | B3 * | 12/2018 | G10L 15/22 |
| WO | 2014060054 | A1 | 4/2014 | |

OTHER PUBLICATIONS

Anonymous. "Siri says "surry, I cannollake requests right now. Please try again laler" fix", May 20, 2013 (May 20, 2013), Retrieved from the Internet: https://appletoolbox.com/siri-says-sorry-i-cannottake-requests-right-now-please-try-again-later-fix/, [retrieved on Aug. 4, 2022], 9 pgs.

* cited by examiner

METHOD AND SYSTEM FOR CHECKING AVAILABILITY OF AN ONLINE FUNCTION OF A VOICE RECOGNITION SYSTEM IN A MOTOR VEHICLE

RELATED APPLICATIONS

The present application claims priority to International Patent Application No. PCT/EP2022/061085 to Cullmann, et al., filed Apr. 26, 2022, titled "Method and System for Checking Availability of an Online Function of a Voice Recognition System in a Motor Vehicle," which claims priority to German Pat. App. No. DE 10 2021 205 528.1 filed May 31, 2021, to Cullmann, et al., the contents of each being incorporated by reference in their entirety herein.

TECHNICAL FIELD

The present disclosure relates to a technologies and techniques for checking an availability of an online function of a voice recognition system in a motor vehicle. The present disclosure furthermore relates to a system for checking an availability of an online function of a voice recognition system in a motor vehicle, wherein the system is ultimately designed to carry out the method according to the present disclosure.

BACKGROUND

It may be possible in a motor vehicle that a user of the motor vehicle can control and/or activate a function of the motor vehicle by means of voice input, which is detected and evaluated in the motor vehicle. The motor vehicle comprises a voice recognition system for this purpose. Using the voice recognition system, it is possible, for example, to activate a navigation system of the motor vehicle, for example a navigation destination can be stated and selected for the navigation system via voice input. As an alternative or in addition, a multimedia device of the motor vehicle can be activated and/or a telephone call with, for example, a mobile phone positioned in the motor vehicle can be initiated by means of the voice recognition system.

The voice recognition system in the motor vehicle typically has at least one function, which can be fully carried out in the motor vehicle itself at any time. Such a function is referred to as an onboard function or offline function of the voice recognition system. In contrast, the voice recognition system typically has at least one further function, which is only available when a communication link exists between the motor vehicle and an external device, such as an Internet connection that exists with a server device situated outside the motor vehicle. The reason for this may be that information from the external server device is needed for carrying out the at least one further function. Such a function dependent on the communication link is referred to as an online function of the voice recognition system. Using the online function, it is possible, for example, to call up current weather information in the motor vehicle, support a search for a special destination in the navigation system of the motor vehicle and/or play music and/or other media content not loaded in the motor vehicle.

DE 10 2017 220 266 B3 shows a method for checking an onboard voice recognition system of a motor vehicle. When a communication link for carrying out an online function of the voice recognition system in the motor vehicle is interrupted, it is ascertained whether a deviation from a comparison result stored in the motor vehicle is recognized when an offline mode of the voice recognition system is used. If this is the case, a notice regarding the interrupted communication link in the motor vehicle is output. The user is thus only informed about the interrupted communication link when using the voice recognition system while the communication link is already interrupted.

DE 10 2014 019 192 A1 shows a motor vehicle that is designed to provide a communication link to a vehicle-external server and to provide an online voice control of a voice recognition system of the motor vehicle via this communication link. Using an output unit, two different representation modes can be displayed, wherein only the onboard voice control is available in the first representation mode, and additionally the online voice control is available in the second representation mode. Depending on the state of the current communication link, one of the two representation modes is selected.

SUMMARY

Aspects of the present disclosure are directed to a solution by means of which a user can be easily and clearly notified of an availability of an online function of a voice recognition system in a motor vehicle.

Certain aspects are achieved by the subject matter of the independent claims.

In some examples, a method is disclosed by means of which an availability of an online function of a voice recognition system in a motor vehicle can be checked. The present disclosure is based on the finding that a notice regarding the availability of the online function of the voice recognition system in the motor vehicle is typically only provided when a user of the motor vehicle would like to use the voice recognition system and activates it for this purpose. As a result, no proactive reporting regarding the availability, or the possible lack of availability, of the online function of the voice recognition system in the motor vehicle is taking place thus far. However, it is useful to continuously check the availability of the online function, and to provide the result of the check in the motor vehicle, so that the user is able to recognize whether or not he or she is able to use the online function at a current point in time at all before he or she even seeks to access the online function of the voice recognition system. As a result, a notification is to be provided to the user at an early stage so as to avoid that the user, for example, is frustrated and/or surprised by an at least temporary lack of availability of the online function. The voice recognition system can be assigned to an intelligent digital assistant.

In some examples, a communication link is provided between a communication interface in the motor vehicle and an external device. The communication interface in the motor vehicle is preferably a component of the motor vehicle itself. As an alternative or in addition, for example, a mobile terminal positioned in the motor vehicle, for example a mobile phone, such as a smart phone, or a tablet, can comprise the communication interface and provide it in the motor vehicle. The external device is, for example, a server device and/or a processing device arranged outside the motor vehicle, which is designed to provide the online function of the voice recognition system for the motor vehicle. The external device thus, for example, includes an evaluation regulation and/or information by means of which the online function can be carried out. The external device may, for example, have the current weather data for a current position of the motor vehicle and/or details regarding special destinations of a navigation system available. Information within the meaning of the present disclosure can encompass data, for example a data packet.

In some examples, a system is disclosed for checking the availability of the online function of the voice recognition system in the motor vehicle. The system is designed to carry out processes and methods according to the present disclosure. Individual components of the system can be designed to carry out the individual method steps, and the combination of the individual exemplary embodiments of the processes and methods. The preferred exemplary embodiments presented herein, and the advantages thereof, thus apply accordingly, where applicable, to the system according to the present disclosure, and can be carried out by corresponding components of the system.

The system may encompass the motor vehicle and the voice recognition system, which includes the online function. Moreover, the system may encompass a control device, an output device, a communication interface and an external device. The communication interface is configured to provide a communication link between the motor vehicle and the external device. The control device may be configured to continuously establish whether the provided communication link exists or is interrupted at a current point in time. The control device may moreover be configured to check whether the online function of the voice recognition system is available via the existing communication link, if the communication link exists at the current point in time. The output device is designed to provide a notification that describes a lack of availability of the online function of the voice recognition system. This occurs whenever the online function is not available and/or the communication link is interrupted.

In some examples, the motor vehicle comprises the voice recognition system, the control device, the output device and/or the communication interface. The motor vehicle can thus be designed to carry out all of the aforementioned method steps of the system or to carry these out at least together with the external device. As an alternative or in addition, it may be provided that the voice recognition system, the control device, the output device and/or the communication interface are not components of the motor vehicle itself, but components of the mobile terminal positioned in the motor vehicle. In the process, the communication link to the external device and the check thereof, as well as the generation of the notification regarding the lack of availability of the online function of the voice recognition system, may be provided by the mobile terminal.

In some examples, the output device may be configured to visually output the notification on a display surface in the motor vehicle. For this purpose, the notification can be displayed on the display surface. As a result of the notification being visually displayed there, it is also output to the user of the motor vehicle, and ultimately provided to the user. The display surface may be configured as a screen, a touch screen, a head-up display, an instrument cluster and/or arranged at a steering wheel of the motor vehicle. In addition, an operating device can be provided, by means of which the pieces of information and/or notices encompassed by the notification can be selected, so that these can be at least displayed. Moreover, it may be provided that individual further method steps provided by means of the notices can be selected by means of the operating element and carried out. As an alternative or in addition, the notification can be acoustically output in the motor vehicle by means of a speaker of the motor vehicle and/or of the mobile terminal of the user.

In some examples, a motor vehicle is disclosed, which is configured to carry out the individual process/method steps. The motor vehicle according to the present disclosure can be configured as a car, for example as a passenger car, or a truck, or as a passenger bus or a motorcycle. The motor vehicle comprises the voice recognition system, the communication interface, the control device and the output device. The exemplary embodiments presented in connection with the method according to the present disclosure and/or the system according to the present disclosure, and the advantages thereof, as well as the combination of the exemplary embodiments, apply accordingly, where applicable, to the motor vehicle, and can be carried out by corresponding components of the motor vehicle.

The present disclosure furthermore encompasses the control device for the system or the motor vehicle. The control device comprises a processor device, which is configured to carry out the processes/methods according to the present disclosure and/or an exemplary embodiment of the method according to the present disclosure. The processor device may include at least one microprocessor and/or at least one microcontroller and/or at least one field-programmable gate array (FPGA) and/or at least one digital signal processor (DSP) for this purpose. The processor device can furthermore include program code, which is configured to carry out the processes/methods according to the present disclosure, one of the exemplary embodiments, or a combination of the exemplary embodiments of the method according to the present disclosure when the program code is being executed by the processor device. The program code can be stored in a data memory of the processor device.

The stated specific values of the minimum duration shall also be regarded as being covered by the scope of the present disclosure within the scope of deviations, for example due to measurement errors, system errors, DIN tolerances, and the like.

The present disclosure also encompasses the combinations of the features of the described exemplary embodiments.

DESCRIPTION OF THE DRAWINGS

Exemplary embodiments of the present disclosure are described hereafter. In the drawings.

DETAILED DESCRIPTION

The exemplary embodiments described hereafter are preferred exemplary embodiments. In the exemplary embodiments, the described components in each case represent individual features of the present disclosure which are to be considered independently of one another and which also refine the present disclosure independently of one another and, as a result, shall also be considered to be an integral part of the present disclosure, either individually or in a combination other than the one shown. Furthermore, the described exemplary embodiments can also be supplemented with additional of the above-described features of the present disclosure.

In the figures, functionally equivalent elements are each denoted by the same reference numerals.

In the examples provided herein, the communication link between the communication interface in the motor vehicle and the external device may be provided in the form of a wireless connection via a wireless local area network (WLAN) and/or a mobile data network, for example based on the mobile communication standard Long Term Evolution (LTE), Long Term Evolution Advanced (LTE-A), or 5th generation (5G). The communication link is preferably already established immediately after or while the motor vehicle is activated, that is, for example turned on. The communication link is designed to be provided during an entire activated or turned-on period of the motor vehicle, that is, to be maintained during an entire usage period of the motor vehicle from the activation thereof until deactivation, for example until the motor vehicle is turned off.

In some examples, the processes and methods may continuously establish whether the provided communication link exists or is interrupted at a current point in time. The continuous establishment should be understood to mean that a state of the communication link is checked at predefined intervals. The predefined intervals can, for example, be between 1 millisecond and several seconds, and in particular 5 milliseconds, 10 milliseconds, 15 milliseconds, 20 milliseconds, 30 milliseconds, 45 milliseconds, 1 second, 1.5 seconds, 2 seconds, 3 seconds, 5 seconds or 10 seconds, or an arbitrary value therebetween, can be selected as the interval between two consecutive checks. As a result, the communication link is repeatedly checked so as to establish whether this link continues to exist at a point of time of the check, that is, at the current point in time, or has meanwhile been temporarily interrupted. The interrupted communication link can alternatively be referred to as a terminated communication link. Ultimately, the current state of the communication link is thus ascertained over and over as soon as the motor vehicle has been activated and/or turned on.

If the communication link exists at the current point in time, a check is carried out in a next method step as to whether an online function of the voice recognition system of the motor vehicle is available via the existing communication link. It is thus checked, for example, whether the communication link is designed in such a way that the online function of the voice recognition system is in fact available via this link. The reason is that the online function of the voice recognition system is based on, for example, information, for example in the form of at least one data packet, being transmitted from the motor vehicle to the external device and/or from the external server device to the motor vehicle via the communication link. If, however, the wireless communication link between the external device and the communication interface in the motor vehicle, for example, is currently too weak, that is, for example, it is only possible to transmit the information at a data rate that is below a limit data rate, the online function may not be available at the current point in time, even though the communication link exists at the current point in time. The reason is that, in this case, the communication link is too weak for carrying out the online function.

As an alternative or in addition, it is possible that, even though the communication link is available, information that, for example, is needed for carrying out the online function and/or a required information packet, which, for example, includes software and/or at least one piece of information needed for carrying out the online function, was not previously loaded in the motor vehicle. In such a situation, it may also be possible that the online function of the voice recognition system in the motor vehicle is ultimately not available via the existing communication link.

If the online function is not available and/or the communication link is interrupted, a notification is provided in the motor vehicle in a next method step, which describes a lack of availability of the online function of the voice recognition system. The notification is an indication, a report and/or a message that is directed at the user, for example. The notification is not designed to only be embodied in the form of a representation mode, but encompasses at least one symbol that is provided in the motor vehicle and points out the notification. The notification is provided regardless of an actual activation and/or use of the voice recognition system. As a result, if it was established that either the communication link, for example, was currently interrupted since, for example, the communication link between the communication interface in the motor vehicle and the external device was terminated, the user of the motor vehicle is notified of this by the notification in the motor vehicle. As an alternative or in addition, the notification is likewise output in the motor vehicle whenever the online function is not available at all, for example since the information needed for carrying out the online function was not previously loaded in the motor vehicle.

The notification can be displayed by means of an output device of the motor vehicle and be provided in this way. For example, a visual and/or an acoustic notification in the motor vehicle is suitable for this purpose. In some examples, the notification can be provided by means of a mobile terminal positioned in the motor vehicle. The notification can include the information that the communication link is currently interrupted and/or the online function of the voice recognition system is not available. In both situations, the online function of the voice recognition system is currently not available. The lack of availability shall thus be understood to mean either the interrupted communication link or the unavailable online function, or both. In these instances, the online function can never be used. In other words, in these instances, the availability of the online function is lacking. As a result, there is a lack of availability of the online function in these instances.

The existence of the communication link and the availability of the online function of the voice recognition system when the communication link exists are checked in a manner that is decoupled from a current use of the voice recognition system. It is therefore irrelevant for the provision of the notification in the motor vehicle whether or not an actual activation and/or use of the voice recognition system, for example by the user of the motor vehicle, has already occurred at the current point in time. If the online function is currently not available, the user is thus alerted proactively to this fact by means of the provided notification, and typically before he or she even intends to use the online function of the voice recognition system. This reduces a sense of frustration and/or surprise on the part of the user as a result of the lack of availability of the online function, which would otherwise potentially occur unexpectedly. The user is thus at all times notified easily and clearly of the availability of the online function of the voice recognition system in the motor vehicle since he or she, by means of the provided notification, is informed about the lack of availability of the system immediately after the lack of availability occurs.

In some examples, it is ascertained whether the online function is not available for a minimum duration and/or the communication link is interrupted for the minimum duration. Only after it has been ascertained that the online function was not available for the minimum duration and/or the communication link was interrupted at least for the minimum duration is the notification provided in the motor vehicle. The minimum duration is 30 seconds, for example. This means that, only when it was in fact established for 30 seconds during the continuous establishment that the provided communication link was already interrupted for at least 30 seconds, is the communication link identified as having in fact been interrupted, and thereupon the notification provided in the motor vehicle. Moreover, even if the communication link exists at the current point in time, but the online function is nonetheless not available, it is checked whether the online function of the voice recognition system is not available for at least the minimum duration, that is, for at least 30 seconds. Only then is the notification provided in the motor vehicle as a result of the non-availability of the online function.

This ensures that the notification in the motor vehicle is provided, and then not provided, consecutively at short intervals, but the notification is only provided when the lack of availability of the online function of the voice recognition system has in fact occurred over a predefined time period, that is, for the minimum duration of, for example, 30 seconds. The user of the motor vehicle is thus not notified by means of the provided notification in the motor vehicle of any lack of availability over a time period that is less than the minimum duration. This is the case, for example, when the lack of availability only lasts for 3 seconds, with the minimum duration being 30 seconds. By taking the minimum duration into consideration, the user of the motor vehicle is prevented from being distracted by, for example, the notification being alternately displayed in the motor vehicle, and subsequently disappearing, at short intervals of a few seconds, or even fractions of a second.

As an alternative or in addition, it may be provided that the notification disappears as soon as the online function is available again. The reason is that the notification is only provided whenever the online function is not available and/or the communication link is interrupted. The online function and/or the communication link preferably have to be available or provided again at least for the minimum duration before the notification disappears, that is, the provision of the notification is ended. In this way, it is achieved that the notification is only no longer provided when the availability of the online function is reliably ensured, namely at least for the minimum duration.

In some examples, the minimum duration is between one second and one minute. In particular, the minimum duration can range between 20 seconds and 35 seconds. Particularly preferably, the minimum duration is 30 seconds. The minimum duration, however, can be, for example, 1 second, 2 seconds, 3 seconds, 4 seconds, 5 seconds, 10 seconds, 15 seconds, 20 seconds, 25 seconds, 30 seconds, 35 seconds, 40 seconds, 45 seconds, 50 seconds, 55 seconds or one minute. As an alternative, it may be provided that the minimum duration is more than one minute, for example 90 seconds, 2 minutes and/or 3 minutes. The minimum duration can, alternatively, take on any arbitrary value between the aforementioned values. Ultimately, it is achieved that an optimal minimum duration can be selected at all times, so as to notify the user of the motor vehicle in a sufficiently up-to-date manner after the lack of availability of the online function was first established.

In some examples, the notification includes at least one of the following pieces or portions of information: The notification can include the information that the communication link is interrupted at the current point in time. This notification is displayed, for example, whenever the provided communication link was permanently, or at least temporarily, interrupted. The interruption can also be referred to as a termination of the communication link. The corresponding notification is preferably only displayed when the communication link has been interrupted at least for the minimum duration.

As an alternative or in addition, the notification can include the information that the existing communication link is too weak at the current point in time for the online function to be available. This can be the case, for example, when the Internet connection, that is, the communication link, is designed in such a way that the current data rate of the provided communication link, that is a digital data volume that can be transmitted via the communication link within a time span, falls short of a predefined limit value, so that the online function of the voice recognition system cannot be made available. This presupposes that the online function stipulates such a limit value, that is, a certain minimum data rate is stated and required for the online function so as to be able to utilize the available online function in the motor vehicle. The data rate can alternatively be referred to as data transmission rate, wherein any information needed by the online function can be encompassed by the digital data volume transmitted during the time span.

In some examples, the notification can include the information that data needed for carrying out the online function is lacking in the motor vehicle. This is the case, for example, whenever the corresponding data, which, for example, describes a certain piece of information and/or a certain information packet of the online function, was not previously loaded in the motor vehicle, for example since this loading was not activated and/or a corresponding booking was not made. This may be the case, for example, when the required data can only be loaded into the motor vehicle for a fee, and the fee-based loading was not previously initiated. In this example, the motor vehicle is ultimately not equipped with the online function since the corresponding required data is lacking. As an alternative or in addition, the required data can include a fundamental piece of information for carrying out the online function and/or an additional packet including, for example, updated additional information. As an alternative or in addition, the required data can be an update for carrying out the online function.

In some examples, the notification can include the information that the online function has not been activated for the current point in time. If, for example, a kind of subscription system exists as a prerequisite for having the online function available in the motor vehicle, it may be established here that, for example, a booking time period for the online function has lapsed and/or that no such booking was previously carried out.

In some examples, the notification can include the information that the online function is not available due to at least one setting related to the voice recognition system. This may be, for example, a system setting that was preselected, for example, for data privacy reasons and/or selected by the user of the motor vehicle in such a way that the online function is not available due to this system setting.

By way of the at least one piece of information included in the notification, the user can learn why and for what reason the lack of availability of the online function exists. The information can be displayed or output directly when the notification is being provided. As an alternative or in addition, it may be provided for this purpose that the provided notification has to be elected or selected, for example by means of an operating element in the motor vehicle, for the at least one piece of information to be in fact discernibly provided for the user. When the availability is being checked, the reasons as to why the online function is not available and/or the communication link is interrupted are thus always additionally ascertained. This is particularly advantageous for the user since he or she can obtain an informative and satisfactory explanation for the lack of availability of the online function.

In some examples, the notification includes at least one of the following notices: The notice to activate the online function if this function has not been activated for the current point in time. Here, for example, an instruction may thus be provided, which preferably clearly demonstrates and explains to the user how the online function previously not activated in the motor vehicle can be activated. For example, a selection function for entering into a corresponding subscription can be made available for this purpose. The selection function can enable the user of the motor vehicle to book the subscription, for example, by actuating an operating element in the motor vehicle. The activation of the online function preferably immediately enables the availability of the online function when a communication link exists.

As an alternative or in addition, the notice can be a notice to load the lacking, but necessary data into the motor vehicle. For example, the notice can include the instruction as to how the loading could be initiated. For example, the corresponding selection function can be made available for this purpose. With this, the loading of the lacking data can be initiated via, for example, the communication link, for example free-of-charge or for a fee. The loaded data is preferably stored in a memory device of the motor vehicle and provided to the voice recognition system.

In some examples, the notice can include a list of all functions that the voice recognition system has, which, however, are not available in the motor vehicle when the online function is not available. The user can consequently learn which functions of the voice recognition system are affected by the non-availability of the online function and/or the interruption in the communication link, and which can therefore not be used by him or her. As an alternative or in addition, it may be provided that either, in general, only all the functions of the voice recognition system, that is, both details regarding individual functions of the online function and details regarding individual functions of the offline function, are listed, wherein, for example, the online functions only available online are visually highlighted. Moreover, it may be provided that in fact only functions in the motor vehicle which are exclusively present as an online function are listed. A person skilled in the art is thus able to gain an overview as to whether it could be worthwhile, for example, to activate the online function.

As an alternative or in addition, the notice may state how the at least one setting is to be modified for the online function to be at least available when a communication link exists. For example, an instruction may be provided as to how the corresponding system setting, which is currently made, for example, for data privacy reasons, can be modified for the online function to at least be available in principle.

In some examples, the notice may state how a desired inquiry, which can only be answered when the online function is available, can be modified into a modified inquiry that can be answered when the online function is not available. For example, a tip or a tutorial may thus be provided for the user, describing and preferably explaining in detail that type of inquiry can only be answered when the online function is available, and possibly how he or she can modify the inquiry so as to nonetheless obtain the desired information. For example, it may be possible that a voice-based search for a special destination can only be used when the online function is available. However, it may be possible that the special destination can essentially also be provided, for example, by means of text input in the navigation system, when the online function is not available, that is, regardless of the communication link, except not as a voice command, but only as a manual command that is entered, for example, via the operating device. The notice may reference this, so that the user is supported in adapting his or her inquiry so as to receive an answer to the desired inquiry, without needing the online function. This is used, for example, whenever the communication link has been terminated and it cannot be estimated when it will be restored again. It is thus ensured that the user is able to access the information he or she requires at any point in time.

The notice mentioned last is possible whenever an offline function is available for the desired inquiry. If the desired inquiry is, for example, the inquiry about current weather information, it may be impossible, for example, by means of a modified inquiry to receive the answer to the desired question which cannot be provided without an existing communication link. The reason is that, in this example, the corresponding weather information cannot be loaded in the motor vehicle without an existing communication link. Overall, assistance is thus provided to the user of the motor vehicle in that potential questions of the user with regard to his or her freedom of action regarding the availability and/or lack of availability of the online function can be clarified.

It may furthermore be provided that the described pieces of information and/or notices are provided in a web application. The web application can be executed on the mobile terminal or in the motor vehicle. In the web application, for example, the change of the setting, the activation of the online function, for example by entering into a subscription, and/or the initiation of the loading of the lacking data can be carried out. The actions that have occurred in the web application are transmitted to the voice recognition system by means of a communication link. The pieces of information and/or notices can be provided in the web application with time offset in relation a trip with the motor vehicle, during which the lack of availability occurred. The web application can be activated and/or controlled by means of a voice command.

Figure 1:
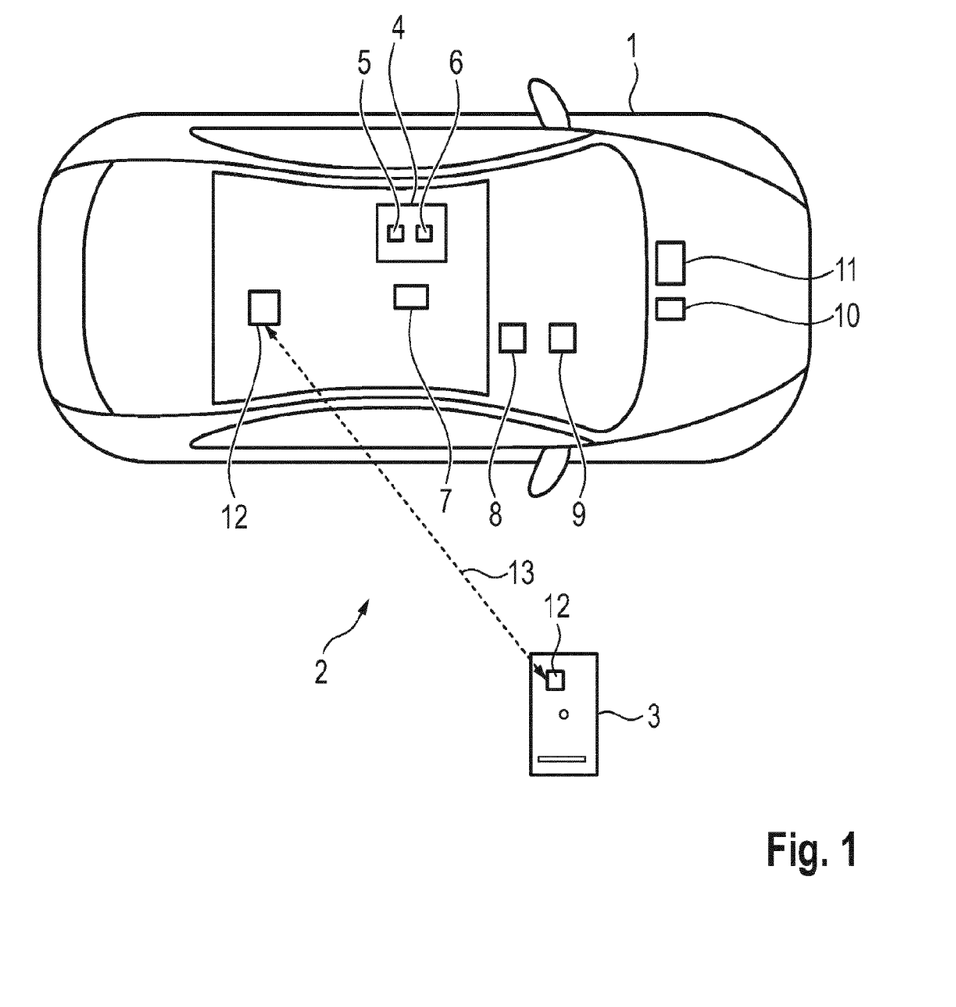
FIG. 1 shows a schematic representation of a system checking an availability of an online function of a voice recognition system in a motor vehicle, according to some aspects of the present disclosure.

Turning to FIG. 1, the drawing illustrates a motor vehicle 1. The motor vehicle 1 is a component of a system 2. The system 2 furthermore encompasses an external device 3, which is arranged outside the motor vehicle 1 and ultimately represents a processing device, that is, for example, a server device. The motor vehicle 1 comprises a voice recognition system 4, which has an online function 5 and an onboard function 6, which can also be referred to as an offline function. The online function 5 is characterized by only being available when information can be transmitted to and/or from and/or information can be exchanged with the external device 3. The onboard function 6 is available in the motor vehicle 1 at all times and is based on evaluation information and evaluation algorithms stored in the motor vehicle 1. Evaluation information can encompass data.

The motor vehicle 1 comprises a microphone 8 and a speaker 9. Voice input of a user of the motor vehicle 1 for the voice recognition system 4 can be detected by means of the microphone 8. For example, a response of the voice recognition system 4 to the previously detected voice input can be acoustically output in the motor vehicle 1 by means of the speaker 9.

The motor vehicle 1 comprises a control device 7. The control device 7 is assigned to the voice recognition system 4 here and can be designed, for example, to carry out the online function 5 and/or the onboard function 6.

The motor vehicle 1 moreover comprises an output device 10, which includes a display surface 11 in the motor vehicle 1 here. The display surface 11 is designed as a touch screen in the area of a center console of the motor vehicle 1. As an alternative or in addition, the display surface 11 can be designed as a non-touch screen, a head-up display, as a display in an instrument cluster and/or as a display on a steering wheel in the motor vehicle 1.

The motor vehicle 1 furthermore comprises a communication interface 12. In addition, the external device 3 likewise comprises the communication interface 12. A communication link 13 can be established between the communication interface 12 in the motor vehicle 1 and the communication interface 12 of the external device 3. At least online function information, which relates to the online function 5, can be transmitted from the motor vehicle 1 to the external device 3 and/or from the external device 3 to the motor vehicle 1 via the communication link 13, which is preferably designed as a wireless communication link 13 and thus, for example, as an Internet connection.

Preferably, an inquiry of the user of the motor vehicle 1, which was detected by means of the voice recognition system 4, is transmitted via the communication link 13 to the external device 3, is processed by the external device 3, for example by means of an evaluation device in the external device 3 (not shown here), and corresponding answer information, matching the transmitted desired inquiry, is transmitted via the communication link 13 to the motor vehicle 1. The motor vehicle utilizes the answer received based on the answer information, for example, for a corresponding output on the output device 10 in response to the inquiry of the user. As an alternative or in addition, the answer can be output by means of the speaker 9 in the motor vehicle 1 and/or be displayed on the display surface 11 of the output device 10.

The online function 5 includes, for example, a search for a special destination entered by means of voice input in a navigation system of the motor vehicle 1, an inquiry regarding multimedia content not stored in the motor vehicle 1, for example a playback of music that is not loaded, and thus only available online, and/or access to online-based weather information regarding the current weather, a charge state of a battery of the motor vehicle 1 and/or further functions only made available online, such as a search for a parking spot in an environment of the motor vehicle 1.

Figure 2:
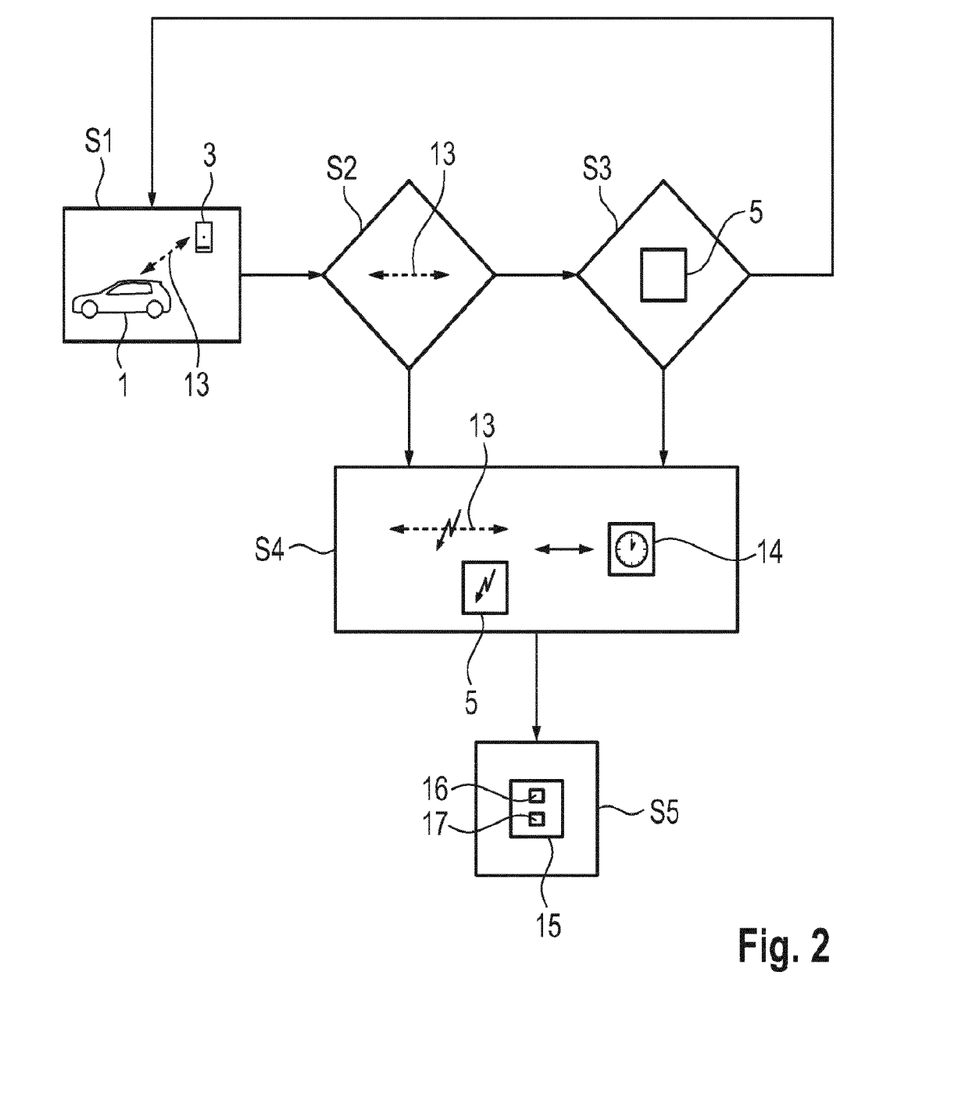
FIG. 2 shows a schematic representation of a signal flow graph for a method for checking an availability of an online function of a voice recognition system in a motor vehicle, according to some aspects of the present disclosure.

FIG. 2 shows a method for checking an availability of the online function 5 of the voice recognition system 4 of the motor vehicle 1. This method is carried out by way of the system 2. As an alternative to the arrangement of the individual system components shown in FIG. 1, a mobile terminal, which is positioned in the motor vehicle 1 and can be designed as a smart phone or tablet, can comprise the control device 7, the output device 10 and/or the communication interface 12. Furthermore, the voice recognition system 4 can be integrated into the mobile terminal.

In a first method step S1, the communication link 13 between the communication interface 12 in the motor vehicle 1 and the external device 3 is provided. Thereafter, in a method step S2, it is continuously established whether the provided communication link 13 exists or is interrupted at a current point in time. The communication link 13 is thus established, for example, when the motor vehicle 1 is started, and thereafter it is checked over and over, for example at continuous intervals of several milliseconds, whether the provided communication link 13 still exists or whether it has since been interrupted or terminated. If it is already established during this process that the communication link 13 is interrupted, it can first be checked whether this interruption has occurred at least for a minimum duration 14. If this is the case, that is, if it is established that the communication link 13 has been interrupted for the minimum duration 14, this is established in a step S4, and the method thereupon proceeds to a method step S5.

If it is established in step S2 that the communication link 13 exists at the current point in time, a check is carried out in a method step S3 as to whether the online function 5 of the voice recognition system 4 of the motor vehicle 1 is available via the existing communication link 13. If the online function 5 is not available, it is likewise checked in step S4 whether this non-availability exists at least for the minimum duration 14. If this is the case, that is, if the online function 5 is in fact not available at least for the minimum duration 14, the method likewise transitions to method step S5.

In method step S5, a notification 15 is provided in the motor vehicle 1, which describes the lack of availability of the online function 5 of the voice recognition system 4. Both when the communication link 13 is interrupted and when the online function 5 is not available, the consequence is that the online function 5 is not available at the current point in time, that is, the availability is lacking. The notification 15 is provided regardless of an actual activation and/or use of the voice recognition system 4, for example by the user of the motor vehicle 1.

The minimum duration 14 is preferably 30 seconds. As an alternative, the minimum duration 14 can range between one second and one minute, and in particular between 20 seconds and 35 seconds.

The notification 15 can include at least one piece of information 16 and/or a notice 17. The information 16 can include that the communication link 13 is interrupted at the current point in time; that the existing communication link 13 is too weak at the current point in time for the online function 5 to be available; that data needed for carrying out the online function 5 is lacking in the motor vehicle 1; that the online function 5 is not activated for the current point in time; and/or that the online function 5 is not available due to at least one setting related to the voice recognition system 4, which, for example, is stored in the control device 7.

The notice 17 can include at least one of the following notices: a notice 17 to activate the online function 5 if it is not activated for the current point in time; a notice 17 to load the lacking data in the motor vehicle 1; a list of all functions that the voice recognition system 4 has, which, however, are not available in the motor vehicle 1 when the online function 5 is not available; a notice as to how to modify the at least one setting for the online function 5 to be available at least when the communication link 13 exists; and/or a notice as to how to modify a desired inquiry, which can only be answered when the online function 5 is available, into a modified inquiry which could be answered if the online function 5 were not available.

Overall, the examples show situational and temporary operating suggestions for a system notice in the form of the notification 15 to the effect that, for example, an intelligent digital assistant, which can be used by means of voice operation, and thus the online function 5 of the voice recognition system 4 are offline at the current point in time. The method according to the present disclosure and the system 2 according to the present disclosure are thus suitable for checking the availability of the online function 5 of the voice recognition system 4 since attention is drawn by means of the notification 15 to the fact that the online function 5 is currently not available. By means of the provided notification 15, the user receives a notice 17 as well as information 16 to the effect that the online function 5 is currently not available, for example due to a lacking communication link 13 to the external device 3. As a result, if the full scope of the functions of the, for example, intelligent digital assistant, that is, the functions of the voice recognition system 4, is currently not available, the notification 15 is provided.

The lack of availability of the online function 5 can, for example, cause a limited search for a special destination of the navigation system of the motor vehicle 1 by means of voice input. Moreover, when there is a lack of availability, no so-called media-on-demand function and/or individual functions of an internal web application, such as a weather forecast and/or charge state information regarding a charge state of the battery of the motor vehicle 1, can currently be available.

In some examples, the voice recognition system 4, in principle, is available both online and offline. Offline, however, the operation or the functional scope of the voice recognition system 4 is typically limited. To ensure that the user is always informed in a transparent process about the scope of operation currently available to him or her, and that user frustration can be minimized, the provided notification 15 appears as soon as the online function 5 is generally not available, be it due to a non-availability of the online function 5 per se and/or the interrupted communication link 13. By way of the notification 15, moreover possible reasons for the offline state are displayed, that is, at least one of the pieces of information 16 and/or of the notices 17 can be provided by being displayed, for example. This is possible in that the user, for example, actuates a symbol representing the notification 15 on a touch screen, serving as the display surface 11, and thereupon has the information 16 and/or the notice 17 displayed to him or her.

As soon as the online function 5 is available again, the notification 15 may disappear again, since the notification 15 is only displayed whenever the online function 5 is not available and/or the communication link 13 is interrupted. The online function 5 and/or the communication link 13 preferably have to be available or provided again at least for the minimum duration 14 before the notification 15 disappears. In this way, it is achieved that the notification 15 is only not provided after the availability of the online function is reliably ensured.

LIST OF REFERENCE NUMERALS

1 motor vehicle
2 system
3 external device
4 voice recognition system
5 online function
6 onboard function
7 control device
8 microphone
9 speaker
10 output device
11 display surface
12 communication interface
13 communication link
14 minimum duration
15 notification
16 information
17 notice
S1 to S5 method steps

The invention claimed is:

1. A method for checking an availability of an online function of a voice recognition system in a motor vehicle, comprising:
   providing a communication link between a communication interface in the motor vehicle and an external device;
   automatically and repeatedly determining, at successive points in time, whether the communication link exists or is interrupted;
   when the communication link exists, determining whether the online function of the voice recognition system of the motor vehicle is currently available via the communication link;
   determining that the online function is unavailable and/or interrupted; and
   providing, within the motor vehicle, a notification comprising data describing the unavailable and/or interrupted status of the online function of the voice recognition system, the notification being generated and output independently of any user activation or use of the voice recognition system.

2. The method according to claim 1, further comprising determining whether the online function is unavailable and/or interrupted for a minimum duration, wherein the notification is only provided after it has been determined that the online function was unavailable and/or interrupted for the minimum duration.

3. The method according to claim 2, wherein the minimum duration comprises a range between (i) one second and one minute, or (ii) 20 seconds and 35 seconds.

4. The method according to claim 1, wherein the notification comprises at least one of the following pieces of information:
   information indicating the communication link is interrupted at the current point in time;
   information indicating the existing communication link is too weak at the current point in time for the online function to be available;
   information indicating data needed for carrying out the online function is lacking in the motor vehicle;
   information indicating the online function is not activated for the current point in time; and
   information indicating the online function is not available due to at least one setting related to the voice recognition system.

5. The method according to claim 1, wherein the notification includes at least one of the following notices:
   a notice to activate the online function if this function has not been activated for the current point in time;
   a notice to load lacking data in the motor vehicle;
   a notice indicating a list of all functions that the voice recognition system has, which, however, are not available in the motor vehicle when the online function is not available;
   a notice as to how to modify the at least one setting for the online function to be available at least when the communication link exists; and
   a notice as to how modify a desired inquiry, which can only be answered when the online function is available, into a changed inquiry that can be answered if the online function were not available.

6. The method according to claim 1, wherein the online function comprises a function executed via an internet connection from the vehicle.

7. The method according to claim 6, wherein the internet connection comprises a local area network and/or a mobile data network.

8. A system for checking an availability of an online function of a voice recognition system in a motor vehicle, comprising:
a control device;
an output device, operatively coupled to the control device;
a communication interface, operatively coupled to the control device,
wherein the communication interface is configured to provide a communication link between the motor vehicle and an external device,
wherein the control device is configured to automatically and repeatedly determine, at successive points in time, whether the communication link exists or is interrupted
when the communication link exists, determine whether the online function of the voice recognition system is currently available via the communication link,
and wherein the output device is configured to provide, within the motor vehicle, a notification comprising data describing the unavailable and/or interrupted status of the online function of the voice recognition system, the notification being generated and output independently of any user activation or use of the voice recognition system.

9. The system according to claim 8, wherein the control device is configured to determine whether the online function is unavailable and/or interrupted for a minimum duration, and wherein the output device is configured to provide the notification only after it has been determined that the online function was unavailable and/or interrupted for the minimum duration.

10. The system according to claim 9, wherein the minimum duration comprises a range between (i) one second and one minute, or (ii) 20 seconds and 35 seconds.

11. The system according to claim 8, wherein the notification comprises at least one of the following pieces of information:
information indicating the communication link is interrupted at the current point in time;
information indicating the existing communication link is too weak at the current point in time for the online function to be available;
information indicating data needed for carrying out the online function is lacking in the motor vehicle;
information indicating the online function is not activated for the current point in time; and
information indicating the online function is not available due to at least one setting related to the voice recognition system.

12. The system according to claim 8, wherein the notification includes at least one of the following notices:
a notice to activate the online function if this function has not been activated for the current point in time;
a notice to load lacking data in the motor vehicle;
a notice indicating a list of all functions that the voice recognition system has, which, however, are not available in the motor vehicle when the online function is not available;
a notice as to how to modify the at least one setting for the online function to be available at least when the communication link exists; and
a notice as to how modify a desired inquiry, which can only be answered when the online function is available, into a changed inquiry that can be answered if the online function were not available.

13. The system according to claim 8, wherein the online function comprises a function executed via an internet connection from the vehicle.

14. The system according to claim 13, wherein the internet connection comprises a local area network and/or a mobile data network.

15. A method for checking an availability of an online function of a voice recognition system in a motor vehicle, comprising:
providing a communication link between a communication interface in the motor vehicle and an external device;
automatically and repeatedly determining, at successive points in time, whether the communication link exists or is interrupted;
when the communication link exists, determining whether the online function of the voice recognition system of the motor vehicle is currently available via the communication link;
determining that the online function is unavailable and/or interrupted for a configured duration; and
providing, within the motor vehicle, a notification comprising data describing the unavailable and/or interrupted status of the online function of the voice recognition system, the notification being generated and output independently of any user activation or use of the voice recognition system.

16. The method according to claim 15, wherein the configured duration comprises a minimum duration, and wherein the notification is only provided after it has been determined that the online function was unavailable and/or interrupted for the minimum duration.

17. The method according to claim 16, wherein the minimum duration comprises a range between (i) one second and one minute, or (ii) 20 seconds and 35 seconds.

18. The method according to claim 15, wherein the notification comprises at least one of the following pieces of information:
information indicating the communication link is interrupted at the current point in time;
information indicating the existing communication link is too weak at the current point in time for the online function to be available;
information indicating data needed for carrying out the online function is lacking in the motor vehicle;
information indicating the online function is not activated for the current point in time; and
information indicating the online function is not available due to at least one setting related to the voice recognition system.

19. The method according to claim 15, wherein the notification includes at least one of the following notices:
a notice to activate the online function if this function has not been activated for the current point in time;
a notice to load lacking data in the motor vehicle;
a notice indicating a list of all functions that the voice recognition system has, which, however, are not available in the motor vehicle when the online function is not available;
a notice as to how to modify the at least one setting for the online function to be available at least when the communication link exists; and a notice as to how modify a desired inquiry, which can only be answered when the online function is available, into a changed inquiry that can be answered if the online function were not available.

20. The method according to claim 15, wherein the online function comprises a function executed via an internet connection from the vehicle.

\* \* \* \* \*